United States Patent
Araga et al.

(10) Patent No.: US 7,566,088 B2
(45) Date of Patent: Jul. 28, 2009

(54) SUN VISOR FOR AUTOMOBILES

(75) Inventors: Toshitaka Araga, Nagoya (JP); Mitsuo Hosokawa, Nagoya (JP)

(73) Assignee: Hayashi Engineering Inc., Aichi (JP)

( * ) Notice: Subject to any disclaimer, the term of this patent is extended or adjusted under 35 U.S.C. 154(b) by 231 days.

(21) Appl. No.: 10/573,637

(22) PCT Filed: Jul. 2, 2004

(86) PCT No.: PCT/JP2004/009419

§ 371 (c)(1),
(2), (4) Date: Mar. 28, 2006

(87) PCT Pub. No.: WO2005/030512

PCT Pub. Date: Apr. 7, 2005

(65) Prior Publication Data

US 2007/0120388 A1 May 31, 2007

(30) Foreign Application Priority Data

Sep. 29, 2003 (JP) ............................... 2003-337321

(51) Int. Cl.
*B60J 3/00* (2006.01)
(52) U.S. Cl. .................... 296/97.1; 296/97.3; 296/39.3
(58) Field of Classification Search ................ 296/39.3, 296/97.1–97.3; 181/256–258, 284
See application file for complete search history.

(56) References Cited

U.S. PATENT DOCUMENTS

| | | | | |
|---|---|---|---|---|
| 5,454,616 A * | 10/1995 | Aymerich et al. | .......... | 296/97.1 |
| 5,887,933 A * | 3/1999 | Peterson | ..................... | 296/97.1 |
| 6,382,635 B1 * | 5/2002 | Fitzgerald | ..................... | 277/630 |
| 6,439,638 B1 * | 8/2002 | Kawasaki et al. | .......... | 296/97.2 |
| 6,450,560 B1 * | 9/2002 | Sturt et al. | ................... | 296/97.2 |
| 6,504,939 B1 * | 1/2003 | Fukuda | ........................ | 381/386 |
| 6,698,816 B1 * | 3/2004 | Sturt et al. | ................... | 296/97.3 |
| 6,733,072 B2 * | 5/2004 | Jaillet et al. | ............. | 297/180.13 |
| 6,951,362 B2 * | 10/2005 | Tiesler | ....................... | 296/97.1 |
| 6,959,956 B1 * | 11/2005 | Fero et al. | ................... | 296/97.5 |
| 7,380,858 B2 * | 6/2008 | Araga et al. | ................. | 296/39.3 |
| 2001/0033925 A1 * | 10/2001 | Trapp et al. | ............. | 428/311.51 |
| 2002/0067064 A1 * | 6/2002 | Jaillet et al. | ............. | 297/452.27 |

FOREIGN PATENT DOCUMENTS

| | | |
|---|---|---|
| GB | 1149628 | 4/1969 |
| JP | 3-8016 | 1/1991 |
| JP | 6-320949 | 11/1994 |
| JP | 2002-356184 A | 12/2002 |
| JP | 2004-90824 A | 3/2004 |
| JP | 2004-90829 | 3/2004 |
| JP | 9-193658 | 10/2007 |

* cited by examiner

*Primary Examiner*—Glenn Dayoan
*Assistant Examiner*—Gregory Blankenship
(74) *Attorney, Agent, or Firm*—Knobbe Martens Olson & Bear LLP

(57) ABSTRACT

A sun visor for an automobile having a plate-like core provided with multiple micropores each having a diameter ranging from 1 to 5 mm. Open area ratio representing the ratio of the total area of micropores to the projected area of the plate-like core ranges from 2% to 30%. Alternatively, a sun visor for an automobile has a skeletonic core having an air permeability equal to that of the plate-like core provided with multiple micropores. The plate-like core or the skeletonic core is covered with a covering member having a high air permeability.

10 Claims, 4 Drawing Sheets

SUN VISOR FOR AUTOMOBILES

This application is the U.S. National Phase under 35 U.S.C. 0371 of International Application PCT/JP2004/009419, filed Jul. 2, 2004, which claims priority to Japanese Patent Application No. 2003-337321, filed Sep. 29, 2003. The International Application was not published under PCT Article 21(2) in English.

TECHNICAL FIELD

The present invention relates to a shading sun visor for automobiles, and more particularly to a sun visor with a sound absorbing function for automobiles.

BACKGROUND ART

Heretofore, various shading sun visors are mounted on the ceilings of automobile cabins along front and side windshields for protecting occupants against glares.

A sun visor of the above type has a plate-like core (sun visor core) as a shading member and a support shank by which the sun visor core is angularly movably supported on the ceiling. When not in use, the sun visor is retracted out of the way with the sun visor core held against the ceiling. When in use, the sun visor is rotated to depend around the support shank and brought into a usage position between the occupant and the front (side) windshield, and is used as an anti-glare member for partly blocking the eyesight of the occupant.

The sun visor core is designed as an interior finishing member with its surface covered with a surface covering such as of fabric, leather, or the like. The sun visor is disposed in the passenger cabin at a position that can easily be reached by the occupant for the convenience of the occupant, for use with various accessories including a vanity mirror, a ticket holder, a clutter-catcher, etc. Such various s accessories are occasionally added to the sun visor core.

Attempts have been made to improve the above conventional sun visor for better use as the anti-glare member, better design as the interior finishing member, and better convenience in combination with various accessories.

The inventors have conducted a detailed analysis of sound field environments in the passenger cabins of automobiles. The inventors have found as a result of the analysis that since sun visors of the above type are positioned very closely to the head of the occupant though their projected area into the passenger cabin is comparatively small, they have a possibility to function appropriately as an acoustic absorbent for improving the sound field environment around the occupant. As a consequence, the inventors have proposed in JP-A No. 2004-090824 a sun visor structure of high air permeability for significantly improving the sound field environment around the automobile occupant to make the automobile cabin quiet.

DISCLOSURE OF THE INVENTION

JP-A No. 2004-090824 is concerned with a structure wherein a core serving as a principal component of the sun visor is made of a foamed beads material to give a sun visor a sound absorbing capability.

The inventors have studied a process of giving a sound absorbing capability to an automobile sun visor having a plate-like core that is produced, for example, by injection-molding a thermoplastic resin, particularly a so-called clam-shell type sun visor having a plate-like core which comprises a pair of plate-like core components having substantially equal contours and combined in interfitting engagement with each other. Such a clam-shell type sun visor is disclosed in U.S. Pat. No. 5,887,933. The sun visor has a sun visor core comprising face and reverse side plates having substantially equal contours and joined to each other by a hinge edge provided therebetween, the face and reverse side plates being folded back about the hinge edge and superposed one on each other to provide a single plate-like core. With this structure, since the plate-like core is rigid, it is of poor air permeability, and it was difficult in a prior art to give the plate-like core a sound absorbing capability. The inventors have made an intensive study as to a structure for giving a clam-shell type sun visor a high sound absorbing capability, and, as a result, have made the present invention.

It is an object of the present invention to provide a structure which is capable of giving a high sound absorbing capability to a sun visor having a plate-like core, particularly, a clam-shell type sun visor.

Another object of the present invention is to provide a structure which is capable of giving a high sound absorbing capability to a sun visor employing a skeletonic core of thermoplastic resin which has a relatively thick outer frame core and an inner core extending in a plane surrounded by the outer frame core, the inner core being thinner than the outer frame core.

A sun visor for an automobile according to the present invention has a shading plate-like core for use in the passenger cabin of the automobile and a support shaft by which the plate-like core is supported in the passenger cabin. The plate-like core has a plurality of micropores each having a diameter ranging from 1 to 5 mm. The sun visor is characterized in that an open area ratio representing the ratio of the total area of the micropores to the projected area of the plate-like core ranges from 2% to 30%.

Heretofore, a clam-shell type sun visor is poor in air permeability for increasing a sound absorbing capability because its core is in the form of a plate-like core of resin. According to the present invention, the sound absorbing capability is increased by a number of micropores defined in the plate-like core.

The plate-like core needs to have a certain level of rigidity in order to allow the sun visor to be operated easily. The inventors have studied diameters of micropores and open area ratios in order to increase the sound absorbing capability without sacrificing the rigidity, and have found optimum open area ratios. The inventors have also found that the sound absorbing capability can further be increased by covering the plate-like core with a covering member having a certain air permeability.

There have been many automobiles wherein a sound absorbing ceiling finishing member incorporating a sound absorbent is mounted on the ceiling in the cabin. If a sun visor having the structure of the present invention is used on such automobiles, then even when the sun visor core is held against the sound absorbing ceiling when the sun visor is not in use, there does not arise the problem that the sound absorbing capability of the ceiling finishing member is impaired by the sun visor as it covers the sound absorbing ceiling.

BEST MODE FOR CARRYING OUT THE INVENTION

Figure 1:
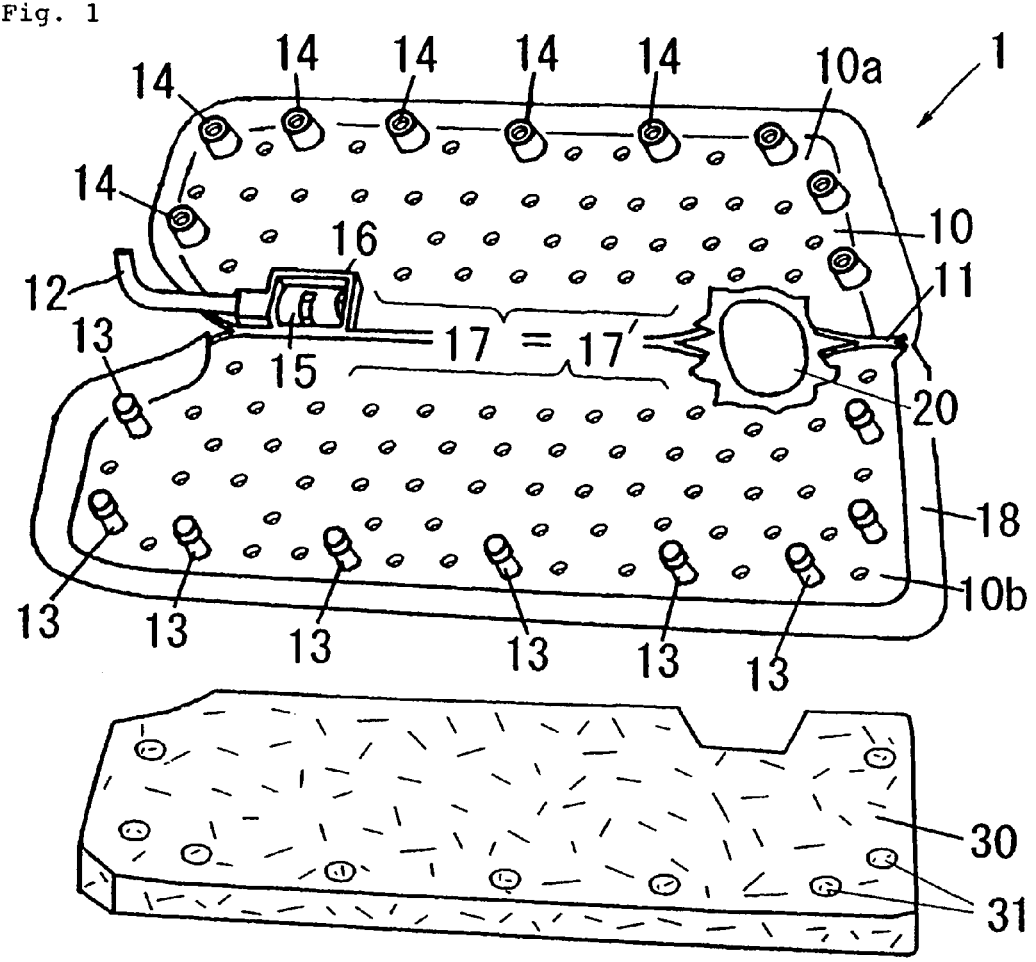
FIG. 1 is an exploded perspective view of a sun visor according to an embodiment of the present invention.

As shown in FIG. 1, sun visor 1 according to an embodiment of the present invention mainly comprises plate-like core (sun visor core) 10 and L-shaped support shank 12 by which plate-like core 10 is rotatably supported on the ceiling of an automobile. Plate-like core 10 has a surface covered with covering member 18 of high air permeability.

As shown in FIG. 1, the form of plate-like core 10 which is most suitable for the present invention has a member made up of face and reverse side plates 10a, 10b having substantially equal contours and joined to each other by hinge 11 provided therebetween. The member is folded back about hinge 11 to superpose face and reverse side plates 10a, 10b on each other, thereby providing single plate-like core 10. Face and reverse side plates 10a, 10b have mutually confronting surfaces having a plurality of engaging pins 13 and engaging recesses 14 which are disposed in confronting positions. Face and reverse side plates 10a, 10b are brought into fitted engagement when engaging pins 13 engage in respective engaging recesses 14.

Face and reverse side plates 10a, 10b that are superposed on each other preferably have a flat hollow space defined therebetween, which preferably is filled with porous sound absorbent 30 such as felt or the like. Sound absorbent 30 has attachment holes 31 and has an outer profile complementary in shape to the space defined between face and reverse side plates 10a, 10b. Therefore, sound absorbent 30 can be placed between face and reverse side plates 10a, 10b. Sound absorbent 30 also operates to reinforce the rigidity of plate-like core 10. If the space is filled with porous sound absorbent 30, it is preferably made of felt of chemical synthetic fiber, air-permeable formed resin material, or the like.

Face and reverse side plates 10a, 10b of plate-like core 10 of sun visor 1 according to the present embodiment are preferably in the form of resin plates (having a thickness ranging from 1.5 to 3.0 m) of polypropylene, ABS resin, nylon, or the like. Plate-like core 10 needs to have a certain level of rigidity when assembled, in order to allow sun visor 1 to be operated easily. Specifically, when the occupant turns sun visor 1 from a usage position to a non-usage position (or from a non-usage position to a usage position), the occupant may possibly grip an end of plate-like core 10 which is remotest from support shank 12 about which plate-like core 10 is rotatable. In this occasion, if plate-like core 10 is not sufficiently rigid, plate-like core 10 may flex between the end thereof and support shank 12.

Face and reverse side plates 10a, 10b of plate-like core 10 have a number of micropores 17, 17' defined therein for increasing air permeability (sound absorbing capability). It has been experimentally confirmed that micropores 17, 17' should have a diameter ranging from 1 to 5 mm, and the number of micropores 17, 17', i.e., an open area ratio (P), i.e., the ratio of the total area (S1) of micropores 17, 17' to the projected area (S0) of plate-like core 10, should be (P)=(S1)/(S0) ranging from 2% to 30%.

The lower limit of the open area ratio (P) is 2% because if the open area ratio is lower than the lower limit, the effect of increasing the sound absorbing capability drops sharply as observed from an evaluation of the sound absorbing capability.

Such an evaluation has been obtained as follows: A knit layer (air permeability: 150 cc/cm$^2$/second) lined with a slab of urethane having a thickness of 2 mm which corresponds to covering member 18 on the face and reverse sides was prepared. Plates of polypropylene having a thickness of 1.5 mm and micropores having a diameter of 4.0 mm uniformly defined therein to provide a predetermined open area ratio, each of which corresponds to each of face and reverse side plates 10a, 10b of plate-like core 10, were prepared. A felt of chemical synthetic fiber having a thickness of 18 mm (fiber diameter of 1.5 denier and density of 0.02 g/cm$^2$), which corresponds to the porous sound absorbent, was prepared. These components were assembled into a structure corresponding to plate-like core 10 of sun visor 1 shown in FIG. 1. The assembled structure was used as a specimen for the evaluation of the sound absorbing capability, and tested to measure a sound absorption coefficient according to a normal-incidence sound absorption coefficient method. The results are shown in FIG. 3 as a graph having a horizontal axis representing the open area ratio (P) and a vertical axis the sound absorption coefficient.

Figure 3:
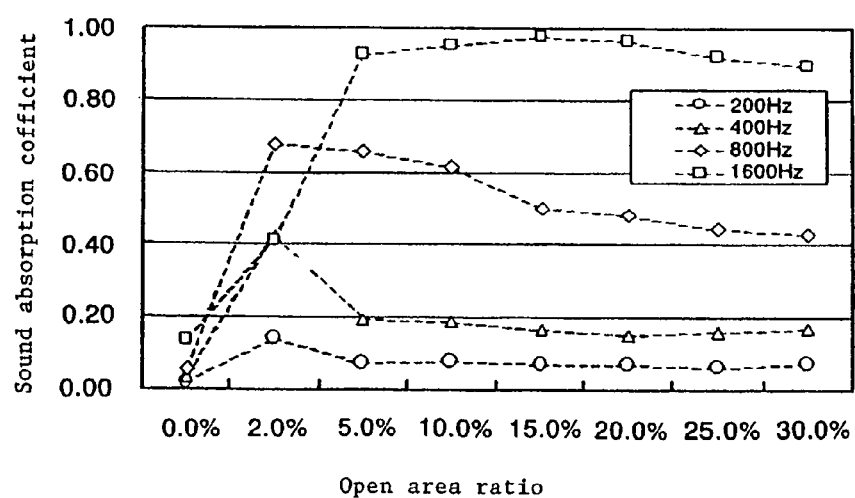
FIG. 3 is a graph showing how the sound absorption coefficient varies depending on the open area ratio.

It can be seen from FIG. 3 that though there are slightly different tendencies at respective frequencies, the sound absorption coefficient is nearly 0 and no sound absorbing capability is obtained if the open area ratio of plate-like core 10 is 0% at any frequencies, and the sound absorbing capability is greatly increased if micropores 17, 17' are defined in plate-like core 10 to achieve an open area ratio in the range from 2 to 5%. This appears to be because if the open area ratio is 0%, no sound absorbing capability is achieved as sound waves are reflected by the surface of plate-like core 10, and if micropores 17, 17' are defined in plate-like core 10, the sound absorbing capability is achieved due to the principles of Helmholtz in the internal space as sound waves penetrate into the interior of plate like core 10. If the internal space is filled with porous sound absorbent 30, then sound waves can penetrate more reliably into the sun visor. If the open area ratio is higher than 2-5%, then the sound absorbing capability peaks out and does not tend to increase further. It was confirmed from the foregoing that the open area ratio should preferably be at least 2% or higher.

The upper limit of the open area ratio (P) is 30% because if the open area ratio is higher than this upper limit, the flexural modulus is notably lowered and the rigidity (flexural modulus) required for plate-like core 10 cannot be achieved.

Figure 4:
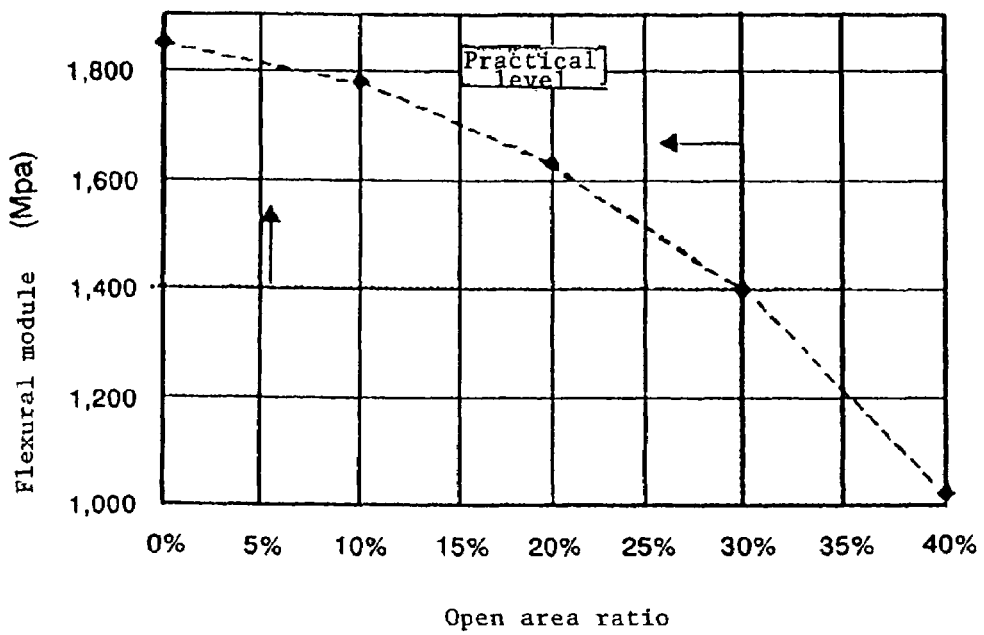
FIG. 4 is a graph showing how the flexural modulus varies depending on the open area ratio.

FIG. 4 shows the relationship between the open area ratio (P) and the flexural modulus of a plate-like core in the form of a plate of polypropylene having a thickness of 1.5 mm. It can be seen from FIG. 4 that if the open area ratio increases, the flexural modulus of the plate-like core tends to be gradually lowered, and the flexural modulus decreases at a greater rate as the open area ratio is higher, suggesting that the plate-like core fails to have a practical level of rigidity for use as the core of a sun visor.

Since it has experimentally been demonstrated that the flexural modulus of the plate-like core of the sun visor should preferably be 1400 MPa or greater, it has been confirmed from FIG. 4 that a practical range in which the flexural modulus of 1400 MPa or greater is obtained is a range in which the open area ratio (P) is 30% or below.

Each of micropores 17, 17' defined in the plate-like core 10 (face and reverse side plates 10a, 10b) should preferably have a diameter in the range from 1 to 5 mm. If the diameter is smaller than 1 mm, then it is unfavorably difficult to form each of the micropores, and the air permeability is lowered. If the diameter of each of micropores 17 is in excess of 5 mm, then, less-preferably, the rigidity of plate-like core 10 near the micropores is partly lowered, and plate-like core 10 possibly flexes when the end of plate-like core 10 is gripped by the occupant to turn the sun visor.

Each of micropores 17, 17' should preferably have a nearly circular or elliptical shape. If micropores 17, 17' have sharp corners, then they unfavorably tend to allow plate-like core 10 to crack.

Micropores 17 may be defined uniformly or nonuniformly in plate-like core 10. It can experimentally be determined to define a relatively large number of micropores 17, 17' at a position where a reduction in the rigidity of plate-like core 10 is small and the effect of increasing the sound absorbing capability is high. Generally, it is preferable to define a relatively large number of micropores 17, 17' centrally in plate-like core 10 than peripherally in plate-like core 10.

With plate-like core 10 being constructed of face and reverse side plates 10a, 10b, micropores 17 (17') may be defined in at least one of face and reverse side plates 10a, 10b. A higher sound absorbing capability is achieved if micropores 17 (17') are defined in the side plate which faces the occupant when sun visor 1 is turned to the non-usage position along the ceiling.

If micropores 17, 17' are defined both face and reverse side plates 10a, 10b of plate-like core 10, then micropores 17 in face side plate 10a and micropores 17' in reverse side plate 10b should preferably be positioned out of alignment with each other as viewed in a direction perpendicular to the surface of plate-like core 10. Advantages accruing from micropores 17, 17' defined in face and reverse side plates 10a, 10b out of alignment with each other are as follows:

With respect to the sound absorbing function, when sun visor 1 is in the non-usage position, the path of sound waves traveling through the internal space of plate-like core 10 in the route from micropores 17 in face side plate 10a through micropores 17' in reverse side plate 10b to the internal finishing member of the ceiling can be longer if micropores 17, 17' are positioned out of alignment with each other than if they are positioned in alignment with each other. Micropores 17, 17' thus positioned out of alignment allow the sound waves to act greatly on filling porous sound absorbent 30, resulting in a higher sound absorbing effect. A preferable shading capability is also achieved if micropores 17, 17' are positioned out of alignment with each other. This is because the transmission of light rays and the transparency of the covering member can be unfavorably reduced by positioning micropores 17, 17' out of alignment with each other.

The outer circumference of plate-like core 10 is covered with covering member 18 for better design.

It has experimentally confirmed that covering member 18 used in the present invention should preferably be highly permeable to air with air permeability of 6 cc/cm$^2$/second or higher. Unless the air permeability is equal to or higher than 6 cc/cm$^2$/second, sound waves are unfavorably less liable to enter micropores 17, 17' defined in plate-like core 10, resulting in a reduction in the sound absorbing capability. Preferably, covering member 18 comprises a fiber-constructed member such as a non-woven fabric covering member, a knit covering member, or a textile fabric covering member. For better design, covering member 18 needs to have a unit area weight large enough for the occupant to fail to see micropores 17, 17' defined in plate-like core 10 through covering member 18.

In FIG. 1, U-shaped spring indicted with reference number 15 is mounted around the outer circumferential surface of support shank 12 in order to generate biasing forces. When plate-like core 10 is turned about support shank 12, U-shaped spring 15 increases resistance to the turning motion beyond a certain angular position, allowing the sun visor to be easily positioned in that angular position. U-shaped spring 15 is placed in housing 16 that is integrally formed with face side plate 10a or reverse side plate 10b of plate-like core 10. Opening 10 is defined in the boundary between face and reverse side plates 10a, 10b across hinge 11 serves to support a knob (not shown) for giving assistive support to plate-like core 10, in a position exposed out of plate-like core 10.

A specific mode of using sun visor 1 according to the present embodiment in an automobile will be described below with reference to FIG. 2.

Figure 2:
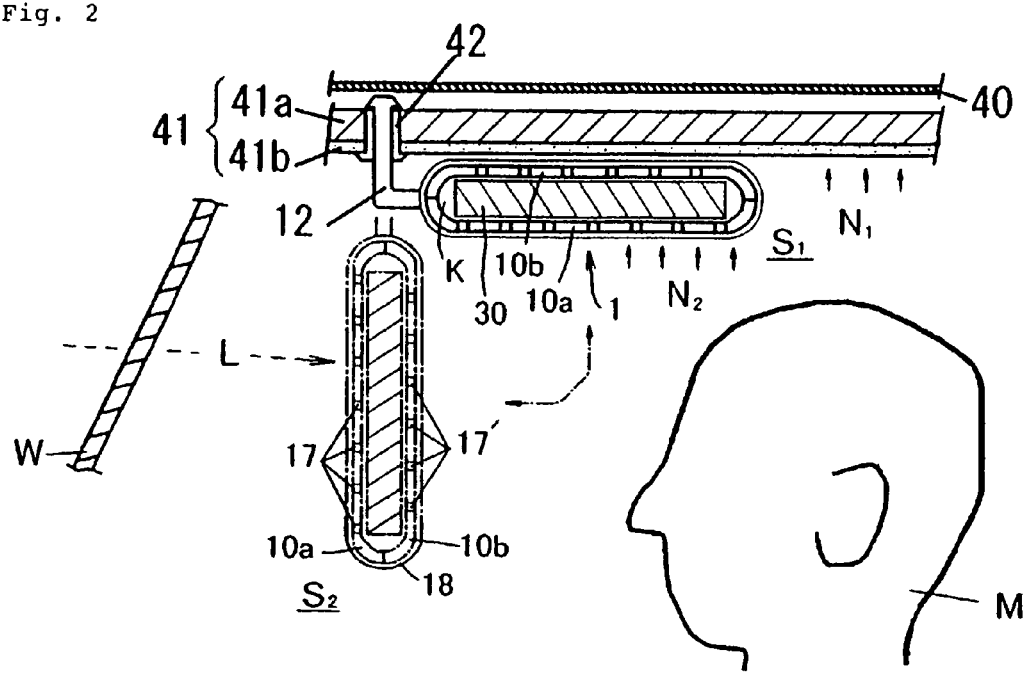
FIG. 2 is a cross-sectional view of the sun visor shown in FIG. 1 as it is mounted on the ceiling of an automobile.

FIG. 2 is a cross-sectional view showing sun visor 1 constructed by assembling plate-like core 10 and other components and mounted on the ceiling of an automobile.

When sun visor 1 according to the present embodiment is in use, plate-like core 10 is rotated to depend downwardly around support shank 12 and brought into the position between the occupant and the front windshield, and is used as an anti-glare member for blocking light from a front light source.

The ceiling of the automobile generally has ceiling finishing member 41 disposed beneath and along roof panel 40. Ceiling finishing member 41 serves to cover roof panel 40 to provide a decorative design for the covered area. Ceiling finishing member 41 comprises base 41a having certain rigidity and covering member 41b covering the interior side of base 41a. Ceiling finishing member 41 has an attachment hole defined partly therein for support shank 12 of sun visor 1. L-shaped support shank 12 of sun visor 1 is angularly movably supported by bracket 42 mounted in the attachment hole for angular movement about bracket 42.

Plate-like core 10 of sun visor 1 is rotatable about support shaft 12, and can rotate from non-usage position $S_1$ along ceiling finishing member 41 to usage position $S_2$ depending between occupant M and the front windshield.

Occupant M usually does not bring sun visor 1 into usage position $S_2$ in most time zones, and plate-like core 10 of sun visor 1 remains disposed in non-usage position $S_1$ along ceiling finishing member 41. In this position, sun visor 1 according to the present embodiment has a high sound absorbing capability, and particularly functions best if ceiling finishing member 41 has a high sound absorbing capability (high air permeability).

Ceiling finishing member 41 which is particularly suitable for the present invention has its base 41a and covering member 41b made of a highly air-permeable material, and provides a high sound adsorbing capability due to the air permeability. If sun visor 1 of the high sound absorbing capability according to the present embodiment is combined with ceiling finishing member 41 of the high sound absorbing capability, then the sound field environment around occupant M in the cabin below ceiling finishing member 41 and sun visor 1 is greatly improved due to the synergic effect.

Specifically, as shown in FIG. 2, wind noise produced as the vehicle travels enters into the passenger cabin of the automobile near the ceiling, and is irregularity reflected by an inner cabin surface of the automobile to occupant M as schematically indicated by $N_1$. At this time, if ceiling finishing member 41 which is positioned closely to the head of the occupant and has a large projected area has the high sound absorbing capability as described above, then it reduces the reflection of the sound waves from the surface of ceiling finishing member 41, and the sound waves penetrate into ceiling finishing member 41 wherein the energy of the sound waves is absorbed, thus minimizing sound waves traveling toward the occupant, as is known in the art.

If sun visor 1 according to the present embodiment is positioned on the interior side of ceiling finishing member 41 of the high sound absorbing capability, as shown in FIG. 2, then in an area where sun visor 1 is located, sound waves $N_2$ enter sun visor 1 and their energy is absorbed thereby. Part of the sound waves that have entered sun visor 1 travel through plate-like core 10 and reach ceiling finishing member 41 wherein they are further absorbed by the structure of ceiling finishing member 41 described above which has the high sound absorbing capability.

In the position where sun visor 1 is present, the sound absorbing effect of sun visor 1 and the sound absorbing effect of ceiling finishing member 41 of the high sound absorbing capability are combined with each other to produce a preferable synergic effect. (Even if ceiling finishing member 41 does not have the high sound absorbing capability described above, sun visor 1 according to the present embodiment is solely capable of greatly improving the sound field environment around the occupant because sun visor 1 is positioned extremely closely to the head (ears) of the occupant though its projected area is small.

With the conventional automobile sun visors, however, sound waves that penetrate into the sun visor are of a very low proportion, and most sound waves are reflected by the sun visor. Therefore, even if the ceiling finishing member is of a high sound absorbing capability, its sound absorbing effect is impaired by the sun visor.

With respect to the shading function, when sun visor 1 is turned into usage position $S_2$ for shading incident light rays L from face side plate 10a, since covering member 18 is highly permeable to air and thin according to the present embodiment, if micropores 17 in face side plate 10a and micropores 17' in reverse side plate 10b are positioned in alignment with each other as viewed in a direction perpendicular to the surface of plate-like core 10, then incident light rays L enter through micropores 17 in face side plate 10a into plate-like core 10, and pass through micropores 17' in reverse side plate 10b toward occupant M at a high ratio. Therefore, occupant M may possibly see micropores 17' defined in plate-like core 10 through covering member 18, resulting in an unfavorable appearance.

If micropores 17 in face side plate 10a and micropores 17' in reverse side plate 10b are positioned out of alignment with each other as viewed in a direction perpendicular to the surface of plate-like core 10, then the ratio at which the light rays pass through the plate-like core is advantageously reduced as much as possible.

SPECIFIC EXAMPLE

Sun Visor According to a Specific Example:

A sun visor according to a specific example comprises a plate-like core in the form of a clam shell of polypropylene (having a thickness of 2.5 mm) having face and reverse side plates having substantially equal contours and joined to each other by a hinge, the face and reverse side plates being superposed on each other. The plate-like core has a profile represented by a substantially elongate rectangular shape having a size of 19 cm by 46 cm and has a projected area of 790 cm$^2$. A hollow space having a thickness of 20 mm is defined between the face and reverse side plates of the plate-like core.

The face and reverse side plates have a number of circular micropores each having a diameter of 3.0 mm and uniformly arranged in a staggered pattern at a density of 1.4 micropores/cm$^2$. (The micropores in the face and reverse side plates are disposed out of alignment with each other as viewed in a direction perpendicular to the surface of the plate-like core.) The total area of the micropores is 78.7 cm$^2$, and the open area ratio (P) is 10.0%.

The plate-like core has a flexural modulus of 1780 MPa, which provides a rigidity required for the sun visor.

The outer surface of the sun visor is covered with a covering member made of PET. The covering member has an air permeability of 150 cc/cm$^2$/s (JISL-1096).

Structure of a Comparative Sun Visor:

A comparative sun visor has a plate-like core in the form of a clam shell similar to the sun visor according to the specific example of the present invention. However, the clam shell of the comparative sun visor differs from the clam shell of the sun visor according to the specific example in that it has face and rear side plates free of micropores and an open area ratio (P) of 0%.

The plate-like core has a flexural modulus of 1840 MPa, which has a rigidity required for the sun visor.

The outer surface of the sun visor is covered with a covering member which is the same as with the specific example of the present invention.

Sound Absorbing Capability Evaluation Process:

A sedan-type middle-size passenger automobile was used, and the sun visor according to the specific example of the present invention and the comparative sun visor were disposed in non-usage position $S_2$ shown in FIG. 2. A speaker was placed at a position 1 m ahead of the A pillar, and radiated random noise. A noise level at the height of the ear position of the occupant was measured to confirm how wind noise was propagated to the occupant in the automobile cabin.

The automobile under test had an air-permeable ceiling finishing member of a high sound absorbing type.

Figure 5:
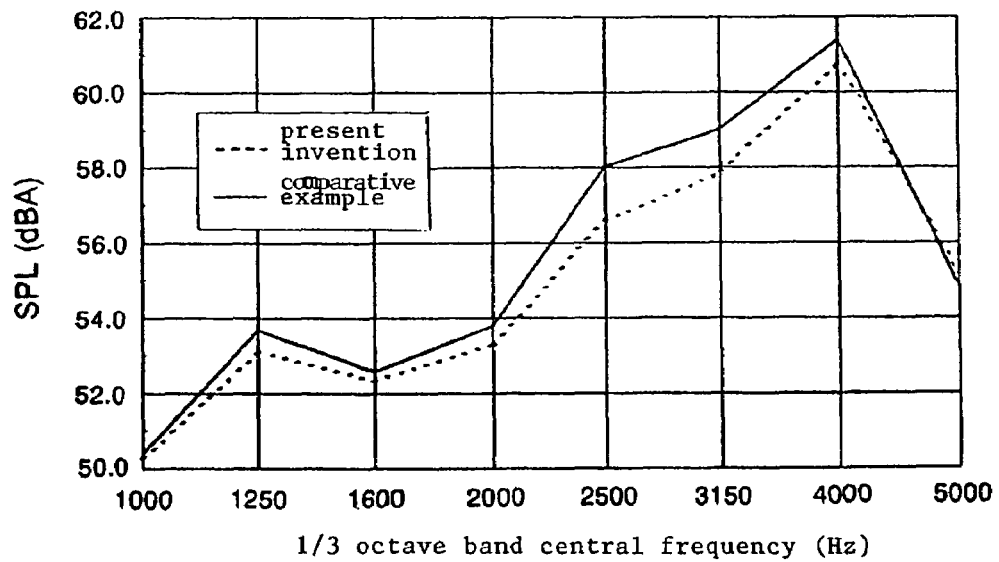
FIG. 5 is a graph showing the results of a noise level evaluation of an actual automobile.

Results of the Evaluation:

FIG. 5 is a graph showing measured results.

The dotted-line curve represents the measured results of the evaluation with respect to the sun visor according to the specific example of the present invention, and the solid-line curve the measured results of the evaluation with respect to the comparative sun visor.

On the vehicle equipped with the sun visor according to the specific example of the present invention, the noise level at the ear position of the occupant was reduced in a wide frequency range and, particularly, was a maximum of about 1.7 dB lower than on the vehicle equipped with the comparative sun visor in the vicinity of 2500 Hz. Therefore, the sound absorbing effect of the sun visor according to the present invention was confirmed.

Figure 6:
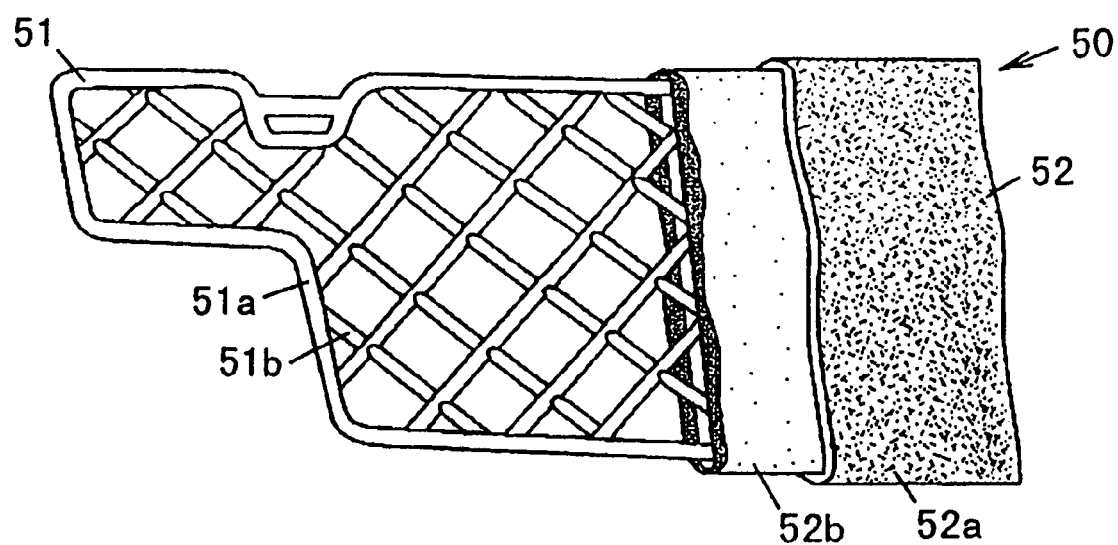
FIG. 6 is a perspective view, partly broken away, of a sun visor according to another embodiment of the present invention.

FIG. 6 shows another preferred embodiment of the present invention.

Sun visor 50 according to the present embodiment has a core comprising skeletonic core 51 (of thermoplastic resin and having relatively thick outer frame core 51a and inner core 51b extending in a plane surrounded by outer frame core 51a). Skeletonic core 51 is covered with covering member 52 which is highly permeable to air (in the illustrated embodiment, a laminated body of design layer 52a of nonwoven fabric or the like and padding layer 52b of slab urethane foam or the like).

In the present embodiment, the core of the sun visor is skeletonic to increase the air permeability of the sun visor for an increased sound absorbing capability, as with the clamshell type sun visor with the micropores as described above.

The plate-like core may be made of corrugated cardboard surrounded by a metal frame along the outer circumferential edge of the sun visor, rather than thermoplastic resin, with the outer surface of the core being covered with a covering member. This alternative sun visor can also have a sound absorbing capability by using a structure in which air permeability is increased as with the above embodiments.

The invention claimed is:

1. A sun visor for an automobile, having a shading plate-like core for use in a passenger cabin of the automobile and a support shaft by which said plate-like core is supported in the passenger cabin, said plate-like core having a plurality of micropores each having a diameter ranging from 1 to 5 mm, wherein an open area ratio representing a ratio of a total area of said micropores to a projected area of said plate-like core ranges from 2% to 30%.

2. The sun visor for an automobile according to claim 1, wherein said plate-like core comprises a superposed assembly of a face side plate and a reverse side plate which have substantially equal contours, said micropores being defined in at least one of said face side plate and said reverse side plate.

3. The sun visor for an automobile according to claim 1, wherein said plate-like core comprises a superposed assembly of a face side plate and a reverse side plate which have substantially equal contours, said micropores being defined in both said face side plate and said reverse side plate, and wherein the micropores defined in said face side plate and said reverse side plate are disposed out of alignment with each other as viewed in a direction perpendicular to a surface of said plate-like core.

4. The sun visor for an automobile according to claim 2, wherein said face side plate and said reverse side plate have a hollow space defined therebetween when said face side plate and said reverse side plate are superposed on each other.

5. The sun visor for an automobile according to claim 4, wherein said hollow space defined in said plate-like core is filled with a porous sound absorbent.

6. The sun visor for an automobile according to claim 5, wherein said sound absorbent comprises felt.

7. The sun visor for an automobile according to claim 1, wherein said plate-like core has an outer surface covered with a covering member having a high air permeability of at least 6 cc/cm$^2$/second.

8. A sun visor for an automobile, comprising:
a shading plate-shaped core having a plurality of pores each having a diameter ranging from 1 to 5 mm and formed in a thickness direction, wherein said plate-shaped core comprises a face side plate and a reverse side plate which have substantially or nearly the same contour and are coupled with each other, said pores being formed in at least one of said face side plate or said reverse side plate, said face side plate and said reverse side plate have a hollow space defined therebetween when said face side plate and said reverse side plate are superposed on each other, said hollow space defined in said plate-shaped core is filled with a porous sound absorbent, and a total open area of said pores is 2% to 30% of a projected area of said plate-shaped core ranges from; and
a support shaft connected to said plate-shaped core for supporting said plate-shaped core in a passenger cabin of the automobile,
wherein said plate-shaped core has an outer surface covered with a covering member having an air permeability of at least 6 cc/cm$^2$/second.

9. The sun visor according to claim 8, wherein said plate-shaped core comprises a face side plate and a reverse side plate which have substantially or nearly the same contour and are coupled with each other, said pores being formed in both said face side plate and said reverse side plate, and wherein the pores formed in said face side plate and the pores in said reverse side plate are disposed out of alignment with each other as viewed in the thickness direction.

10. The sun visor according to claim 8, wherein said sound absorbent comprises felt.

* * * * *